Feb. 2, 1971 TAKAYASU INOUE 3,560,990
TIME RECORDER
Filed July 22, 1968 14 Sheets-Sheet 5

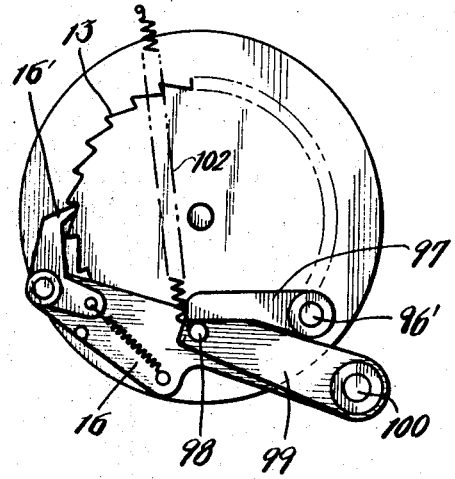
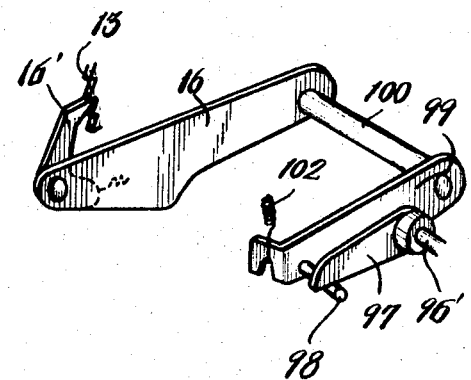
FIG. 13.  FIG. 14.
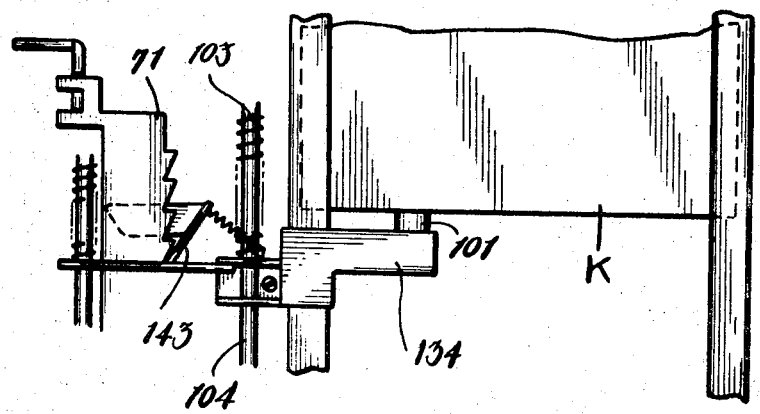
FIG. 15.

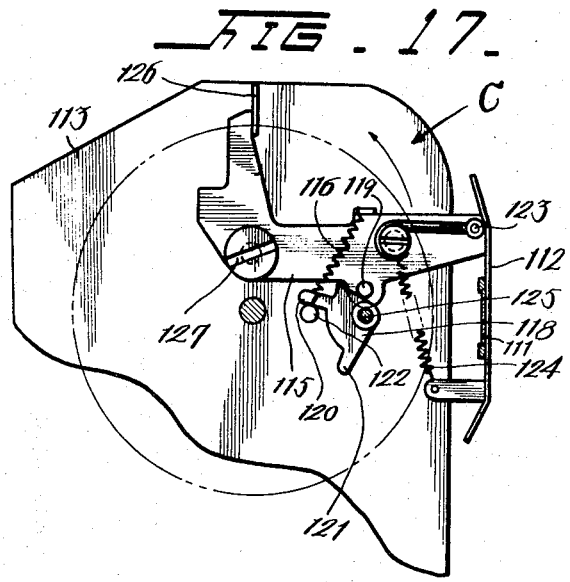
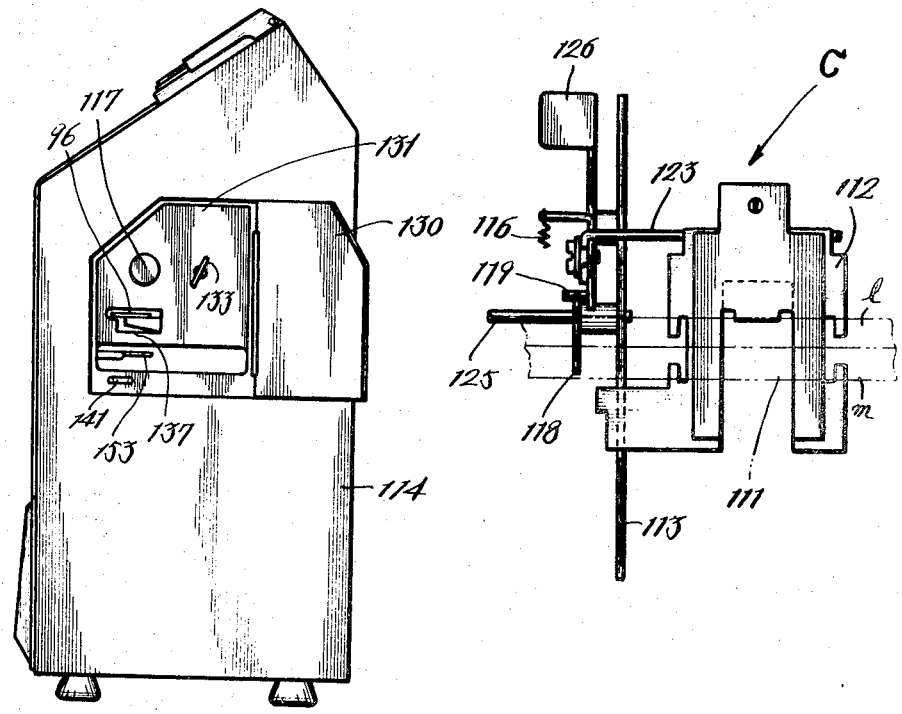

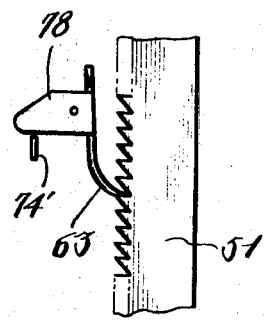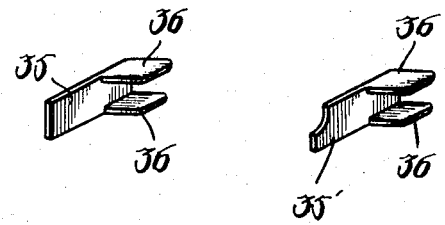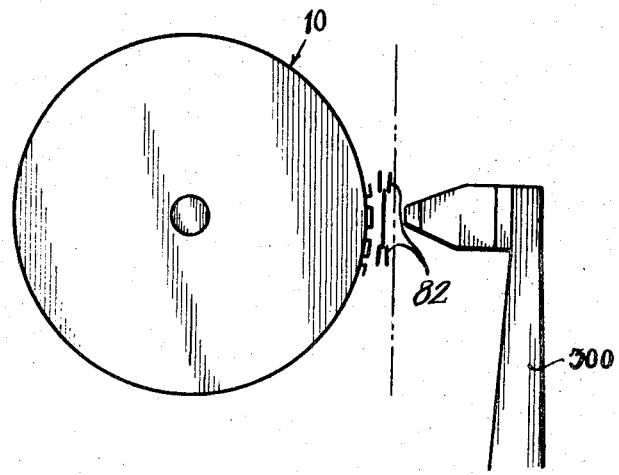

United States Patent Office 3,560,990
Patented Feb. 2, 1971

3,560,990
TIME RECORDER
Takayasu Inoue, 838 Rokkakubashi-machi, Kanagawa-ku, Yokahama, Kanagawa Prefecture, Japan
Filed July 22, 1968, Ser. No. 746,352
Int. Cl. G07c 1/14
U.S. Cl. 346—20                                      1 Claim

ABSTRACT OF THE DISCLOSURE

In a time recorder of which recording operation is performed by a hammering member actuated through the electromagnetic circuit, a time recording wheel unit including a minute-wheel, an hour-wheel and a day-wheel which are actuated in a predetermined time sequence, a drive device to actuate said time recording wheels in synchronization with a clock hand, and an interlocking device for interconnecting said day-wheel and a card lifting mechanism, whereby no pendulum is required and a compact construction is realized, and said time recorder further including a ribbon shifting device, a power interruption indicating device and a time indicating device.

BACKGROUND OF THE INVENTION

In a conventional time recorder when the time recording wheels and the hands of the clock mechanism are to be adjusted, a spring having one end anchored to the framework of the time recorder and the other end anchored to the shaft of the hands of the clock mechanism is wound up by rotating a Warren motor, whereby the pendulum, the arm associated with the pendulum, the lever engaging the arm and the escape wheel meshing with the lever are simultaneously rotated. As mentioned above, since the conventional time recorder is provided with the pendulum, the pendulum may cease its swinging movement if the mounting of the time recorder is not disposed in a level or even plane.

And in the conventional time recorder, when the recorder is actuated for time recording operation, a manual arm pivoted adjacent to and associated with the hammering member is pushed so that the hammering member may strike against the back side of a card so as to cause the other or time recording side of the card to impinge upon the minute-, hour- and day-wheels of the time recording wheel unit with a carbon ribbon interposed therebetween.

SUMMARY OF THE INVENTION

The present invention relates to a time recorder, and more particularly to a novel and improved time recorder which does not require such a pendulum as necessitated in any conventional time recorders and is compact in construction.

One object of the present invention is to provide a novel and improved time recorder which is simpler in adjustment of the internal mechanism thereof and easier in operation thereof.

Another object of the present invention is to provide a power interruption indicating device in order to permit restoration of the correct time sequence.

According to the present invention, there is provided a time recorder comprising a main or drive shaft having a gear secured to one end, said gear being in mesh with the rotary shaft of a clock hand, a ratchet wheel having a cam on one side thereof and mounted on said main shaft, a minute-wheel having minute unit indicating embossed numerals provided on its periphery, mounted on said main shaft and laterally spaced from said ratchet wheel, an hour-wheel having an integral ratchet wheel mounted on said main shaft between said ratchet wheel and minute-wheel and having hour unit indicating embossed numerals provided on its periphery, a day-wheel having an integral ratchet wheel mounted on said main shaft on the side of said hour-wheel opposite to said minute-wheel and having day unit indicating embossed numerals provided on its periphery, said minute-, hour- and day-wheels being disposed side by side and forming a time recording wheel unit, a pivotal lever disposed adjacent to said first ratchet wheel that is associated with said minute-wheel and having an engaging pawl adapted to engage such ratchet wheel, a second pivotal lever disposed adjacent to said ratchet wheel that is associated with said hour-wheel and having an engaging pawl adapted to engage such associated ratchet wheel, and a third pivotal lever disposed adjacent to said ratchet wheel that is associated with said day-wheel and having an engaging pawl adapted to engage such associated ratchet wheel, said first lever being actuated as said cam is rotated each one complete revolution by a motor which is adapted to be operated at a time interval of one minute, said second lever being actuated by its associated cam which is in turn associated with the first lever as the cam rotates each one complete revolution, and said third lever being actuated by a switch associated with this third lever as its associated ratchet wheel is rotated every one complete revolution.

The above and other objects and advantages of the present invention will be more readily apparent to those skilled in the art from the following description when read in connection with the accompanying drawings.

BRIEF DESCRIPTION OF THE DRAWINGS

FIG. 13 is a fragmentary side elevational view showing a portion of FIG. 11;

FIG. 14 is a fragmentary perspective view of the feed mechanism for said minute-wheel;

FIG. 15 is a rear elevational view of said card raising mechanism of FIG. 11;

FIG. 16 is a front elevational view of a carbon ribbon mounting device;

FIG. 17 is a side elevational view of a carbon ribbon mounting device shown in FIG. 16;

FIG. 18 is a side elevational view of portion of a manual manipulating device for various inner mechanisms of said time recorder;

FIG. 29 is a fragmentary side elevational view of a stabilizing plate and a detent pawl for said stabilizing plate;

FIG. 30a is a perspective view of a time set piece;

FIG. 30b is a perspective view of a modified form of time set piece;

FIG. 31 is a schematic view showing the relationship between the time recording wheel unit and its associated striking or hammering member.

PREFERRED EMBODIMENT OF THE INVENTION

Figure 1:
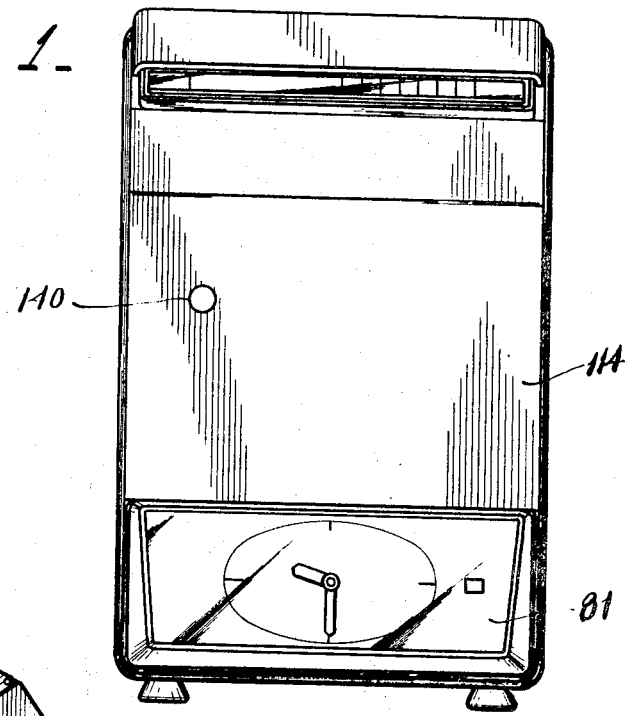
FIG. 1 is a front elevational view of a preferred form of time recorder constructed in accordance with the present invention.
Figure 2:
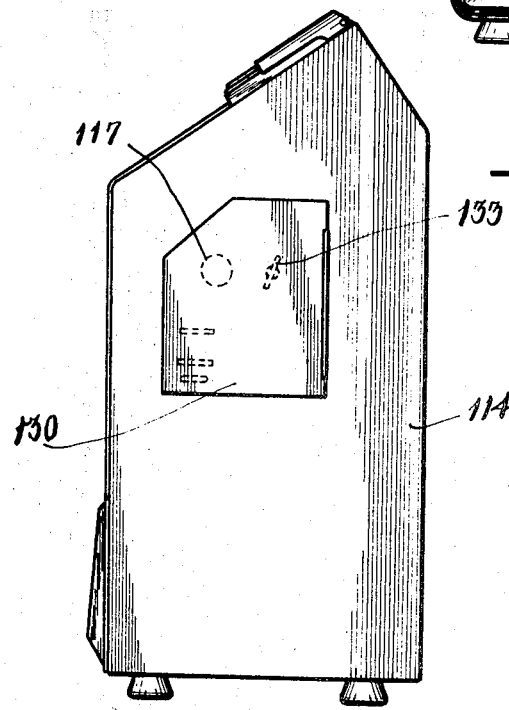
FIG. 2 is a side elevational view of said time recorder as shown in FIG. 1.
Figure 3:
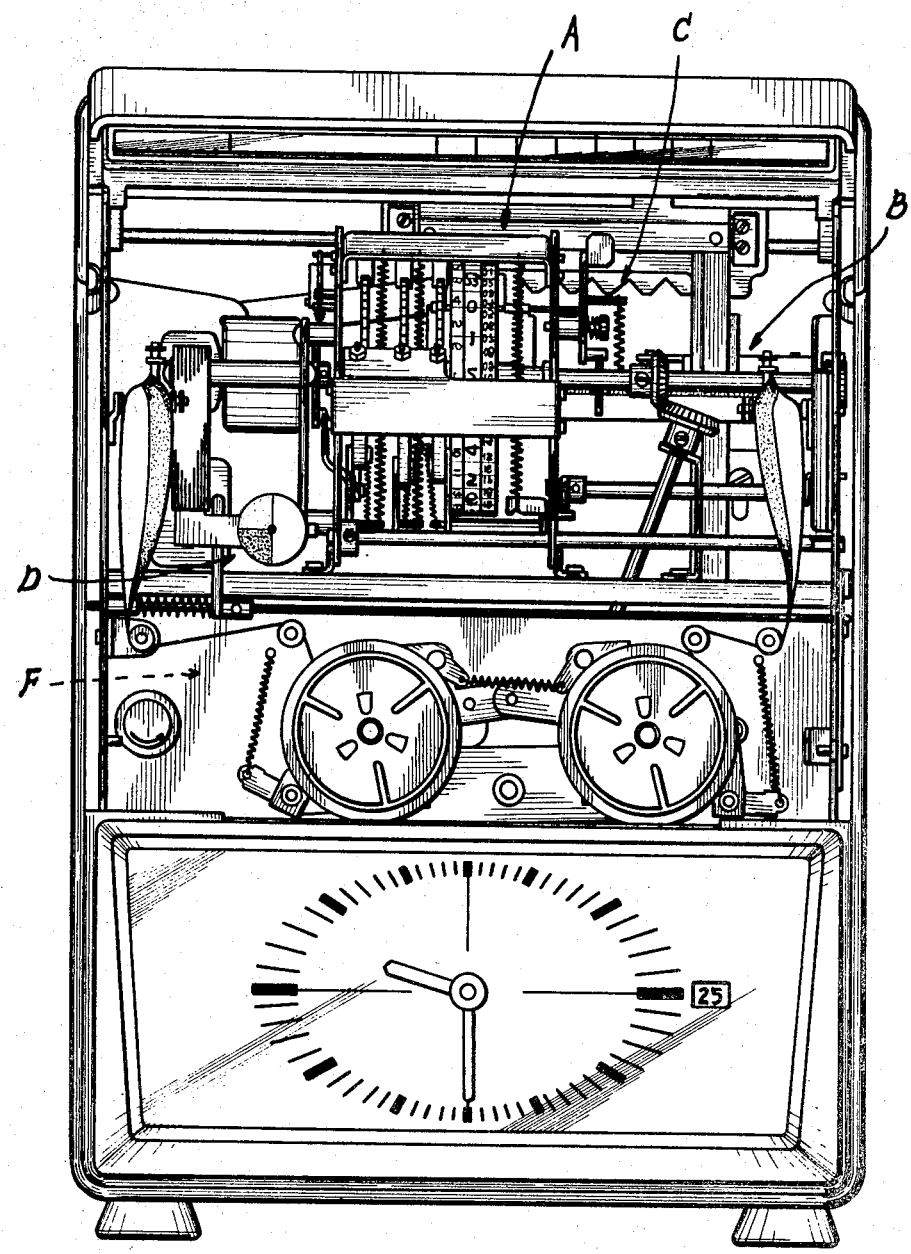
FIG. 3 is an enlarged elevational view of said time recorder with the front cover plate removed therefrom in order to show the interior thereof.

Referring to the accompanying drawings, and more particularly to FIGS. 1 to 3 thereof, the time recorder in accordance with present invention includes a drive device A, an interlocking device B, a ribbon shifting device C, a power interruption indicating device D and a time indicating device F in a casing 114. Each mechanism of said devices will be explained hereinafter.

Referring now to FIGS. 4 through 10 in which the feeding or drive device for the minute-, hour- and day-wheels for a preferred form of time recorder according to the present invention is generally indicated by reference character A in FIG. 3. The drive device A generally comprises frameworks 1 and 113 on which a rotary drive or main shaft 2 is journalled in a known manner. A Warren motor 3 is suitably mounted on a plate attached to the framework 113. The motor has the output shaft 3' and is adapted to be operated at a time interval of one minute. A rotary disc member 4 is mounted on the shaft 3' of the motor 3 adjacent to the drive shaft 2 and inwardly of the Warren motor and has a projection 4' on one side thereof so as to form a cam for driving a suitably pivoted lever 5 of which description will be made hereinafter. The other end of the drive shaft 2 extends through the framework 1 and journalled in the knob 117. A bevel gear 6 is secured to the drive shaft 2 adjacent to the other end thereof and the bevel gear meshes with a similar bevel gear 7 which is secured to one or the upper end of a slanted rotary transmission shaft 8 which is rotated from the drive shaft 2 through the meshing gears 6 and 7 and the slanted shaft 8 in turn operates a clock hand 83 through another and similar gear 7' secured to the lower end of the shaft 8 and a bevel gear 7" mounted on the drive shaft 45 of the clock hand 83.

A ratchet wheel 9 is fixedly mounted on the drive shaft 2 adjacent to and inwardly of the disc member 4 and has 60 teeth in its periphery. The ratchet wheel 9 further has an integral cam member 9' which is concentric with the ratchet wheel. A minute-wheel 10 is fixedly mounted on the drive shaft 2 laterally spaced from the ratchet wheel 9 for rotation in unison with the latter and has 60 embossed numerals from 0 to 59 in its periphery. A ratchet wheel 11 is fixedly mounted on a short hollow shaft 2' which is rotatably mounted on the drive shaft 2 between the ratchet wheel 9 and minute-wheel 10 and the ratchet wheel 11 has a projection 11' on one side and 24 teeth formed in its periphery. An hour-wheel 12 is fixedly mounted on the hollow shaft 2' between the minute-wheel 10 and ratchet wheel 11 in such a manner that the hour-wheel may rotate in unison with the ratchet wheel 11 and the hour-wheel 12 has 24 embossed numerals from 0 to 23 in its periphery.

A ratchet wheel 13 is mounted on the hollow shaft 2' between the ratchet wheel 11 and hour-wheel 12 and has 31 teeth formed in its periphery. A day-wheel 14 is mounted on the hollow shaft 2' in such a manner that the day-wheel may rotate in unison with the ratchet wheel 13 and the day-wheel has 31 embossed numerals 1 to 31 in its periphery. The above-mentioned lever 5 has an engaging pawl 5' secured to the tip end thereof thereto by means of any suitable securing member and the pawl is adapted to engage one selected tooth of the 60 teeth on the ratchet wheel 9 to drive the wheel. Similarly, a second pivotal lever 15 is provided in association with the ratchet wheel 11 and the lever also has an engaging pawl 15' secured to the tip end thereof by any suitable means and adapted to engage one selected tooth of the 24 teeth on the associated ratchet wheel 11 so as to drive the ratchet wheel. A similar third lever 16 is provided in association with the ratchet wheel 13 and the lever also has an engaging pawl 16' which is secured thereto to the tip end thereof by any suitable means and adapted to engage one selected tooth of the 31 teeth on the ratchet wheel 13. A microswitch 19 is mounted on the outside of the framework of the wheel drive device A adjacent to and above the Warren motor 3 and has an operating bar 19' secured thereto by any suitable means. The operating bar 19' is adapted to be pushed by the projection 11' of the ratchet wheel 11 as the projection 11' and accordingly, the ratchet wheel 11 rotates. A magnet 17 is electrically connected to the microswitch 19 by means of a circuit comprising leads X, Y and Z and the magnet is adapted to be energized or deenergized by the closing and opening of the circuit. The magnet 17 is adapted to cause the operating bar 18 of a card receiver (not shown) to move upwardly and downwardly.

As the Warren motor 3 rotates each one complete revolution the lever 5 is pushed by the cam pin 4' on the cam 4 so as to cause its pawl 5' to engage one tooth on the ratchet wheel 9 and as the lever returns to the initial position the pawl 5' rotates the ratchet 9 which is fixedly mounted on the shaft 2 by one tooth. Accordingly, as the ratchet wheel 9 rotates by one tooth in the manner as mentioned above the wheel rotates the shaft 2 by the same angular distance and the minute-wheel 10 which is fixedly mounted on the shaft 2 is also rotated or advanced in the same angular distance or the distance corresponding to the space between each two adjacent embossed numerals in the periphery of the minute-wheel 10 whereby the particular numeral indicating the minute unit immediately following the just now elapsed minute unit may be positively presented to the side of a time-recording card where the elapsed time unit is recorded. As the above operation is repeated 60 times, the cam 9' integral with the ratchet wheel 9 rotates one complete revolution to return to the initial position whereupon the cam 9' pushes the lever 15 to cause the lever to engage its engaging pawl 15' one tooth of the teeth on the ratchet wheel which is disposed in such a position to be engaged by the pawl 15' at the particular time. As the lever 15 pivots back to the initial position the lever pawl 15' is separated from the now engaging tooth on the ratchet wheel 11 whereby the ratchet wheel 11 is rotated by one tooth. As the ratchet wheel 11 rotates in the manner as mentioned above the hollow shaft 2' is rotated in the same angular distance and accordingly, the hour-wheel 12 fixedly mounted on the hollow shaft 2' is also rotated in the same angular distance or by a distance corresponding the space between each two adjacent embossed numerals on the hour-wheel 12 whereby the particular numeral indicating the just now elepased hour is presented to the predetermined hour unit recording section of the recording card. The above operation is repeated twenty-four times and just before the 24th operation is completed, the projection 11' on the ratchet wheel 11 engages the switch operation bar 19' to push the bar so as to close the switch 19 whereupon the magnet 17 connected to day-wheel 14 is energized to rotate the ratchet wheel 13 by one tooth. As the ratchet wheel 13 rotates in the manner as mentioned above the hollow shaft 2' is also rotated in the same angular distance whereupon the day-wheel 14 fixedly mounted on the hollow shaft 2' is rotated in the same angular distance or the angular distance corresponding to the space between each two adjacent embossed numerals on the day-wheel 14 whereby the particular numeral indicating the just now elapsed day is presented to the predetermined day unit indicating section on the recording card. The operation of the wheel driving device A is as just mentioned above, but in this case since the drice shaft 2 is rotated by a predetermined angular distance as the Warren motor 3 rotates one complete revolution or every one minute, the 60-tooth bevel gear 6 secured to the shaft 2 rotates the shaft 8 in the same rate and condition as the drive shaft 2 through the bevel gear 7 which is secured to the adjacent end of the shaft 8 and meshes the bevel gear 6, and the rotation of the shaft 8 operates the clock hand 83 in an exactly synchronized relation to the operation of the recording wheel unit as mentioned above. And accordingly, the data recorded on the card by the time recording wheel unit and those indicated by the time indicating unit are exactly coincident with each other.

Thus, it will be understood that in the illustrated embodiment of the present invention, only by the rotation of the drive shaft 2 by pushing the lever 5 with the cam 4 directly connected to the Warren motor 3, by a predetermined angular distance every one minute the time recording wheel unit and the clock hand 83 can be operated simultaneously at the same rate and under the same conditions, and accordingly, as compared with any conventional time recorder the novel time recorder can be designed in more compact and simpler construction. And when it is desired or necessary to adjust both the wheel units, since such adjustment of the positions of the various time recording and indicating wheels can be performed by adjusting only the position of the drive shaft 2 in conformity with the actual time, as compared with the conventional time recorder the novel time recorder is advantageous over the conventional one and is more practical.

Referring now to FIGS. 11 through 15 in which the interlocking device B for the day-wheel 14, a calender wheel 90 and the card raising mechanism of the present invention is illustrated. The interlocking device B includes the magnet 17 formed within small casing 301 secured to the framework 1 and having an iron core 17' the opposite ends of which extend through the top and bottom of the magnet. A calender wheel 90 having thirty-one numerals from 1 to 31 formed thereon is suitably mounted on a support 94 secured to the machine framework 1 and each numeral of the thirty-one numerals on the calender is adapted to align with the opening formed in the dial face of the clock 81 and indicates the particular day of the month. A card raising ratchet toothed plate 71 is also secured to the machine framework 1 in any conventional manner. A connecting lever 91 is disposed in the path of the iron core 17'. The connecting lever 91 is pivoted to the above-mentioned ratchet toothed card rising plate 71 along and adjacent to which a stationary ratchet toothed plate 71' is disposed. The ratchet toothed plate 71 is adapted to slantly move by means of a pin 92 laterally projecting on one side thereof and a slant elongated slot 93 formed in the stationary ratchet toothed plate 71'. A pawl 91' is provided in the connecting lever 91 adjacent to the pivoted point of the lever and a co-operating ratchet wheel 95 is suitably provided in the position to be engaged by the pawl 91'. A manual lever 96 is pivoted at the upper end of the slantly movable ratchet toothed plate 71 and has a pivot shaft 96' in a position between the opposite ends at which a presser lever 97 is pivoted. Pawl arm 16 associated with the ratchet wheel 13 is rotationally fixed to a lever 99 having a laterally projecting pin 98 which is adapted to be engaged and pressed down by the lever 97. Lever 99 to which one end of a spring 102 is anchored and a pin 100 connects the day-wheel 14 and pawl arm 16. Accordingly, when current is allowed to flow through the magnet 17 the card abutment piece 101 (FIG. 15), the calender wheel 90 and day-wheel 14 are simultaneously operated and both the wheels 14 and 90 are advanced or rotated by one tooth respectively and the card abutment piece 101 is also raised by a predetermined distance. The card abutment piece 101 is adapted to descend to the initial lowermost position after the same has reached the predetermined upper limit position. The card abutment piece 101 is provided with a pawl 143 which is adapted to engage the ratchet teeth on the card raising ratchet toothed plates 71 and 71' and move upwardly along a guide bar 104 on which a spring 103 is disposed. Accordingly, the day-wheel 14, the calender wheel 90 and the card abutment piece 101 actuated are positively and in synchronization.

Next referring to FIGS. 16 and 17 in which the carbon ribbon shifting device C of the present invention is illustrated. In these figures, reference numeral 111 indicates a carbon ribbon having the black band $l$ and the red band $m$ which extend in parallel relation in the longitudinal direction of the ribbon as in the conventional ribbon. The carbon ribbon 111 is adapted to pass along a path defined by a passage defining piece 112 which is movably mounted on a stationary part 113 connected to a mounting member 115 pivoted at the machine framework 1 and a spring 116 is anchored at one end to the mounting member 115 so as to normally urge the mounting member 115 downwards. A knob 133 is provided on one outer side of the machine framework 1 and a cam 118 is provided in a position to be upwardly urged against the pin 119 on the mounting member 115 by manipulating the knob 133 overcoming the force of the spring 116. Either the black band $l$ or red band $m$ may be presented to the predetermined time recording position or in alignment with the window where the striking or hammer member is positioned depending upon the position of the cam 118. The cam 118 has two angularly spaced lateral projections or stoppers 120 and 121 on one side thereof and the projections are adapted to alternately engage the lateral projection or pin 122 on one side of the stationary part 113 of the machine framework 1 and hold the cam 118 in predetermined positions. The ribbon passage defining member 112 is suspended from a support pin 123 one end of which is secured to the mounting member 115 and the free end of the support pin hangs the member 112. A compressed spring 124 is disposed between the lower end of the passage defining member 112 and the mounting member 115 and the spring is adapted to lightly urge the lower end of the member 112 against the stationary frame part 113 and stabilizes the member 112 in position. The cam 118 is pivoted at a support pin 125 which extends transversely of the cam 118. A manual handle 126 is provided in the mounting member 115 and pivoted at a transversely extending support pin 127. As the handle 126 is manipulated in the arrow direction as seen in FIG. 17, the mounting member 115 is rotated in the counter-clock direction in FIG. 17 so that the mounting member 115 may be displaced out of the ribbon passage whereby the ribbon 111 may be easily shifted vertically. Therefore, the ribbon can be easily shifted so as to present the now inactive color band to the time recording position in alignment with the window 82 and dislocate the now active color band to the inactive position.

Figure 4:
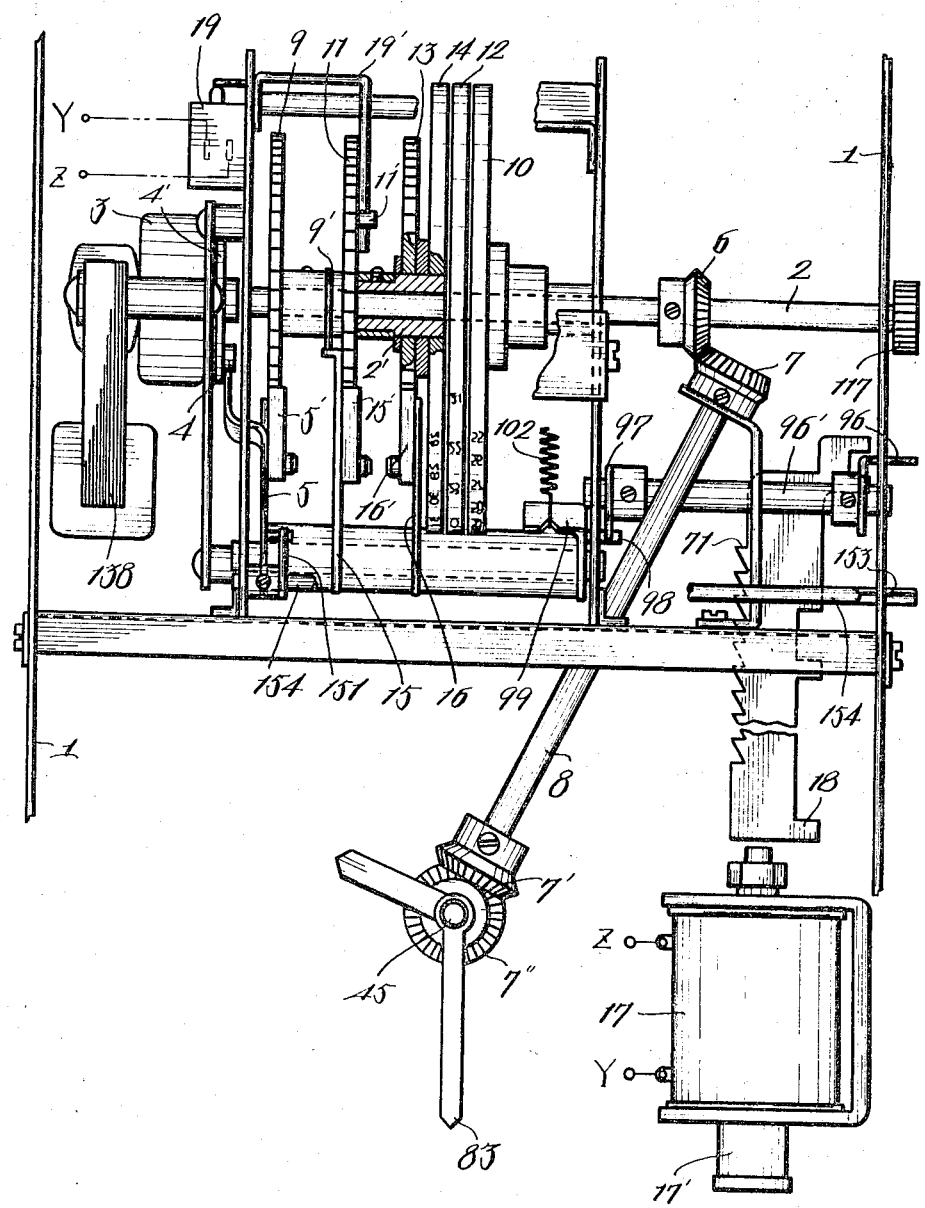
FIG. 4 is a schematic fragmentary elevational view showing some essential portions of said time recorder.
Figures 5, 6:
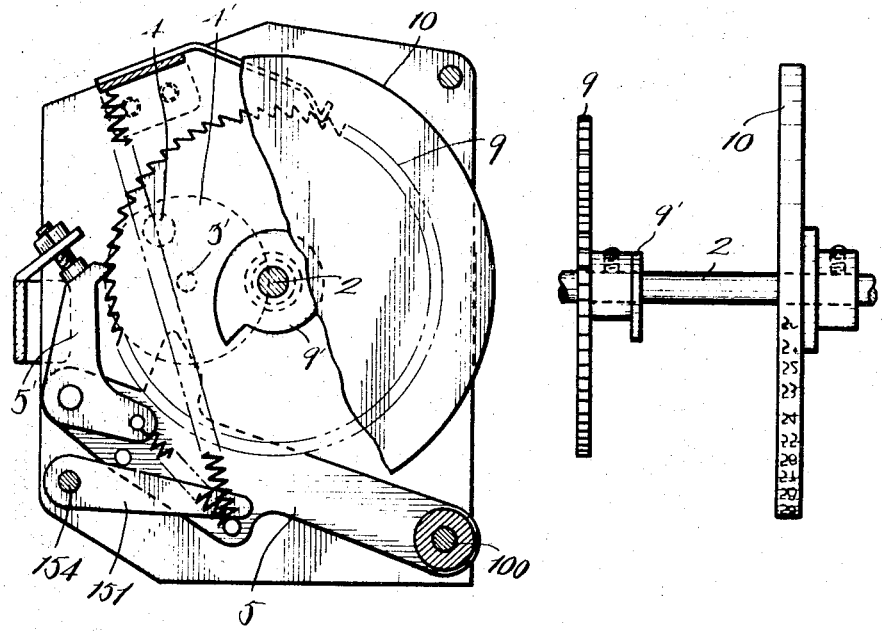
FIG. 5 is a front elevational view of a minute-wheel and the drive mechanism for said minute-wheel.
FIG. 6 is a side elevational view of said minute-wheel and drive mechanism therefor of FIG. 5.
Figures 7, 8:
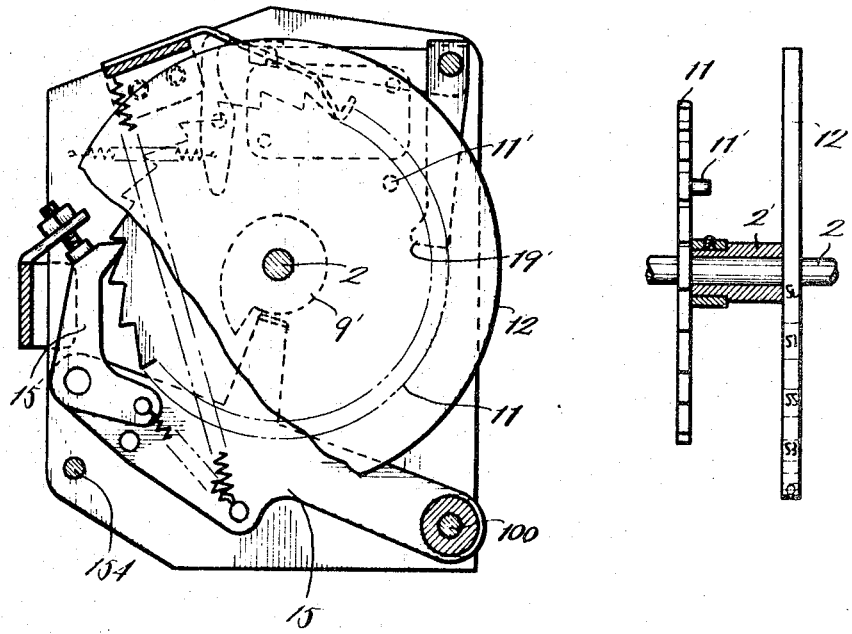
FIG. 7 is a front elevational view of an hour-wheel and the drive mechanism for said hour-wheel.
FIG. 8 is a side elevational view of said hour-wheel and drive mechanism therefor of FIG. 7.
Figure 9:
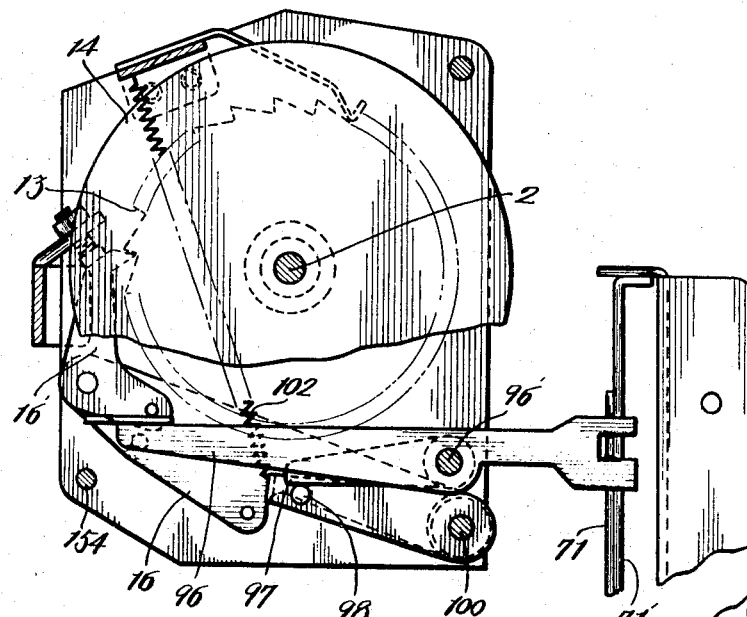
FIG. 9 is a front elevational view of a day-wheel and the drive mechanism for said day-wheel.
Figure 10:
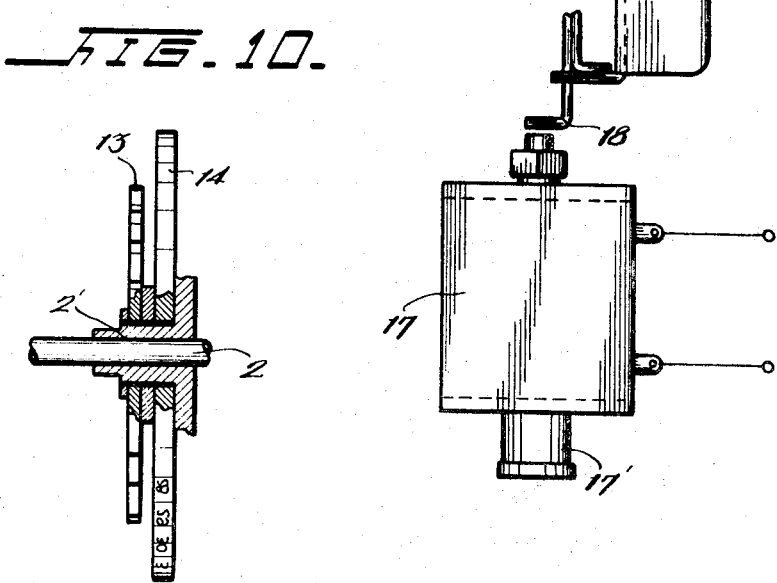
FIG. 10 is a side elevational view of said day-wheel and drive mechanism therefor of FIG. 9.
Figure 11:
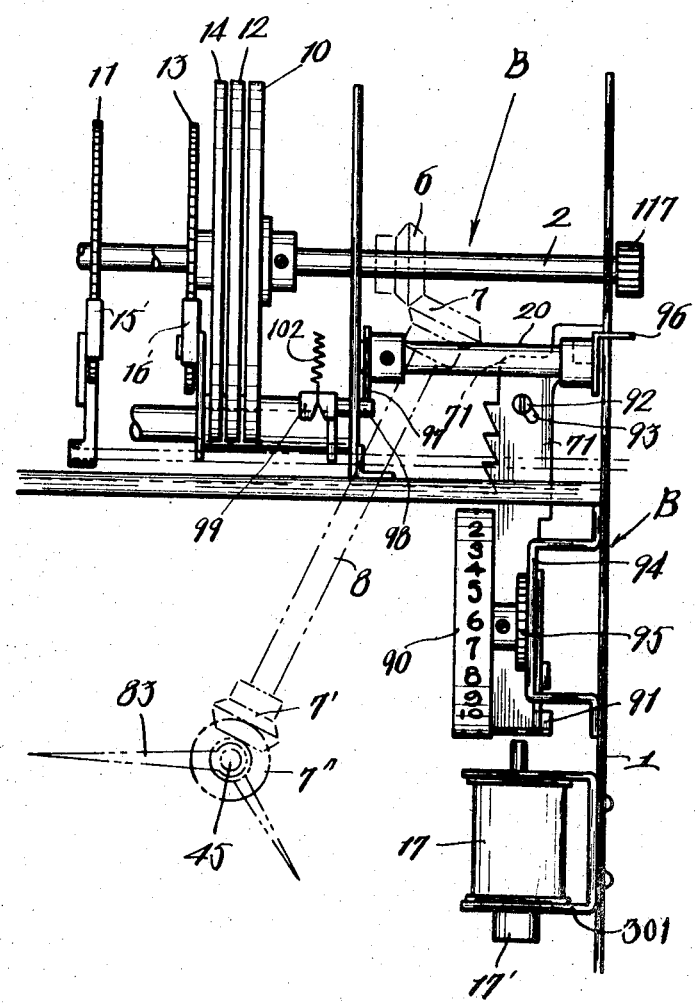
FIG. 11 is a schematic view showing the relationship between a time recording wheel unit, a calender wheel and a card raising mechanism in the embodiment shown in FIG. 4.
Figure 12:
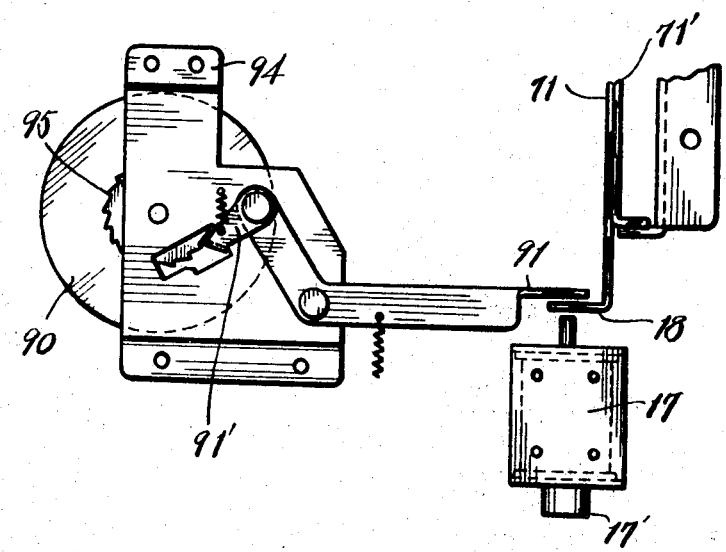
FIG. 12 is a fragmentary view on an enlarged scale of a portion of FIG. 11.
Figure 19:
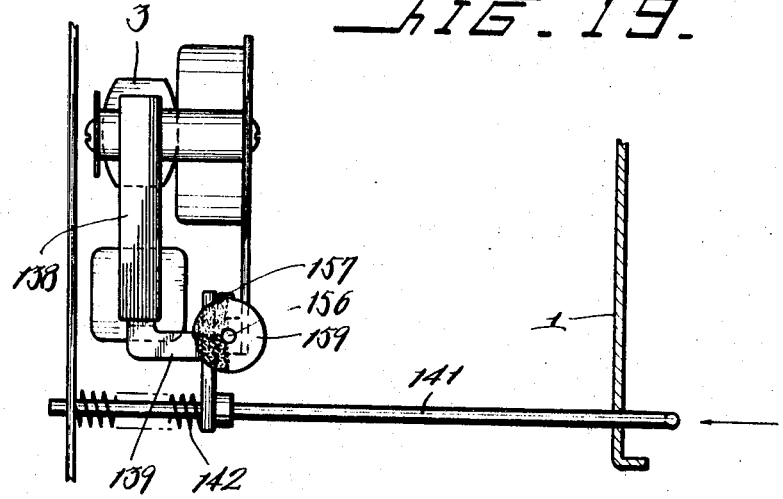
FIG. 19 is a front elevational view of the power supply interruption and continuation indicating mechanism for said time recorder.

Referring now to FIGS. 15, 18 and 19 in which the device D for adjusting the time recording and indicating wheel units, and shifting the operative position of the carbon ribbon, and for operating the power interruption indicating device are shown. The above-mentioned device is enclosed in an interior 131 provided at a suitable position on one side of the casing 114 and normally closed by a hinged cover plate 130. The right hand end of the drive shaft 2 (as seen in FIG. 4) extends through the interior 131 of the casing 114 and a manual knob 117 is fixedly provided at the extreme end of the shaft extension. A knob 133 is provided within the interior 131 for manually shifting the carbon ribbon vertically. The interior is provided with a window 137 into which one end of a day adjusting level 96 extends and the day adjusting lever is adapted to advance the day-wheel 14 by one embossed numeral and to actuate the card abutment member 134. The Warren motor 3 is provided with a core 138 to which a power interruption indicating member 139 is normally attracted and when power interruption occurs an attractive piece 139 is caused to separate from the core 138 thereby to rotate a power interruption indicating disc 159 which is operatively connected to the power indicating member 139. The power indicating disc 159 is adapted to provide the information of power interruption to the operator through a window 140 (see FIG. 1) provided in the machine framework 1 by being rotated by a manipulation bar 141 on which a spring 142 is disposed. One end of the manipulating bar 141 is urged against the casing cover plate 130 opposing the force of the spring 142. As mentioned above, the drive shaft 2 is interlocked to the shaft 45 for the clock hands through the bevel gears of the intermediate connecting bar 8. The cam 118 (FIG. 17) is fixed to the end of a shaft 125 of a knob 133 and push up the member 112 mounting the tape 111. The day adjusting lever 96 is supported on a intermediate shaft 96'. The abutment member 134 for the card K has an engaging pawl 143 secured thereto and the manual level 96 is pivoted to the ratchet toothed plate 71 which is engaged by the engaging pawl 143. Then the date is adjusted by the manual level 96 as illustrated in FIG. 11.

A pusher piece 153 (FIG. 4) is pivoted at one end of a lateral level 154 extending through the machine framework 1 for rotating the minute-wheel 10 and the longer clock hand 83 in synchronization by a distance corresponding to one minute. A lever piece 151 is provided at other end of the lateral level 154 and connects to the engaging pawl 5' through the lever 5 and engages ratchet wheel 9 mounted on the drive shaft 2. Accordingly, when the pusher piece 153 is depressed down the drive shaft 2 is rotated so as to rotate the minute-wheel 10 by one embossed numeral and the longer clock hand 83 by the distance corresponding to one minute. However, when the knob 117 is gripped and rotated the minute-wheel 10 and the longer hand 83 can be rotated by a greater angular distance respectively. Furthermore, the power indicating disc 159 is journalled on a shaft 156 which extends transversely of the machine and when the cover plate 130 is opened, even if the projection 157 on the disc is caused to abut against the pusher member 158 by the action of the spring 142 and the pusher member 158 on the manipulating bar 141 is displaced, the attractive piece 139 is held in engagement with the core 138 by current flowing through the core. When power supply to the motor 3 is interrupted the attractive piece 139 is separated from the core 138 and then the cover plate 130 is opened whereupon the pusher piece 153 is displaced back to the initial position thereby to return the motor to the power flowing condition. When the cover plate 130 is opened various adjusting operations can be performed at one place and by the action of the spring 142, the power interruption condition can be returned to the power flowing condition.

Figure 20:
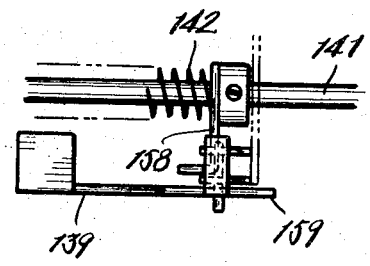
FIG. 20 is a plan view of portion of said power supply interruption and continuation indicating mechanism of FIG. 19.
Figure 21:
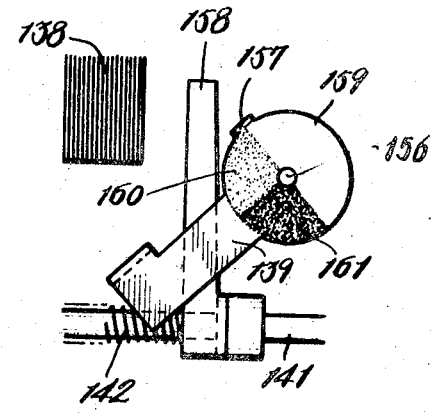
FIG. 21 is a front elevational view of said power supply interruption and continuation indicating mechanism showing the same in its actuated state.
Figures 22, 23:
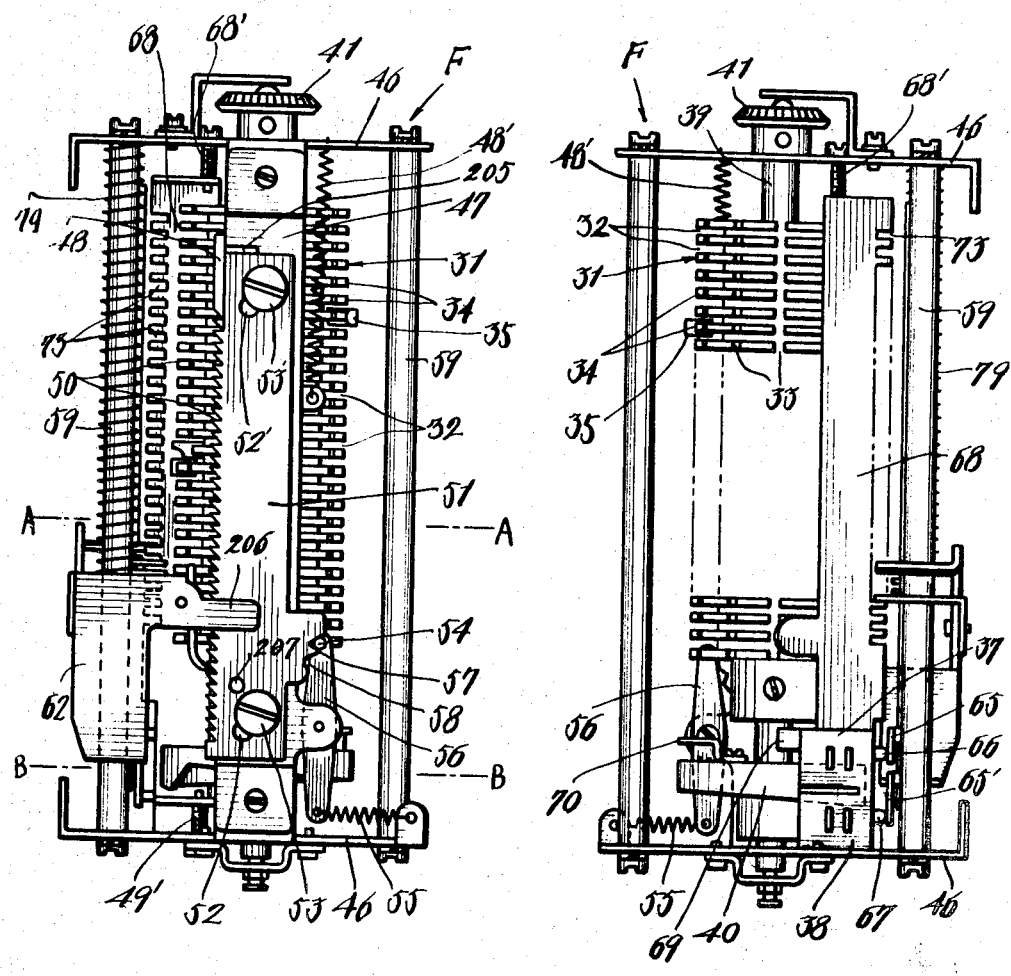
FIG. 22 is a front elevational view showing another example of a time indicating device.
FIG. 23 is a rear elevational view of said time indicating device of FIG. 22.
Figure 24:
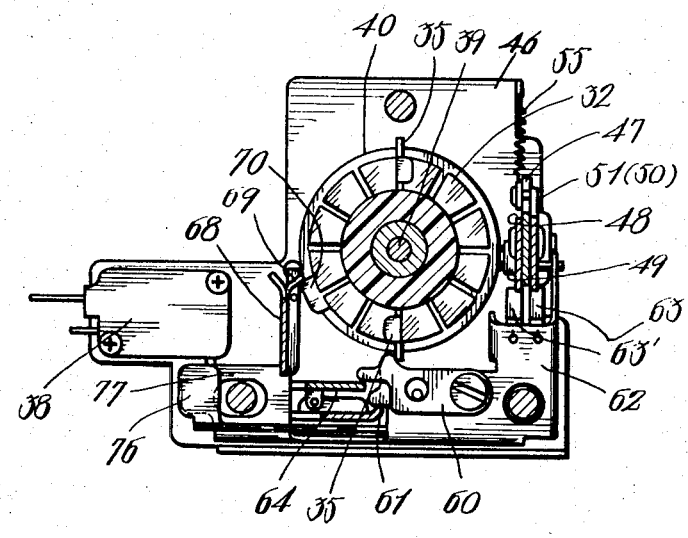
FIG. 24 is a cross sectional view substantially taken along the line A—A of FIG. 23.
Figure 25:
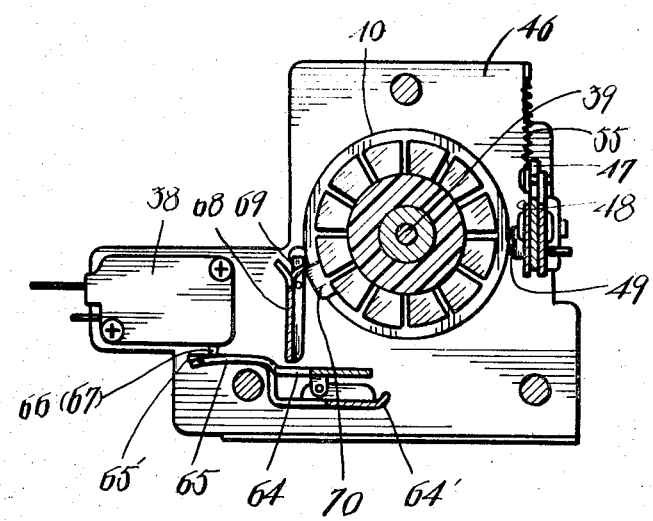
FIG. 25 is a cross sectional view substantially taken along the line B—B of FIG. 23.
Figure 26:
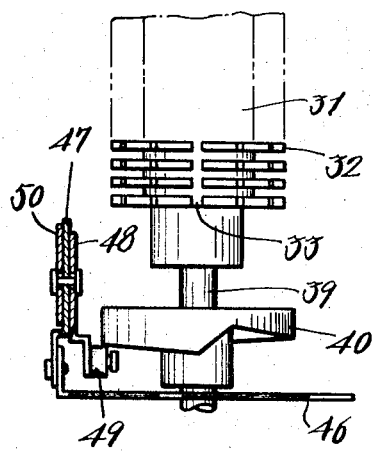
FIG. 26 is a fragmentary view of said time indicating device of FIG. 22 especially showing the cam drive mechanism of the time indicating device.

The mechanism E for indicating power interruption and power flowing conditions and for adjusting the clock in accordance with the given indication will be described referring to FIGS. 20 and 21. An indication disc 159 is rotatably provided adjacent to the core of the Warren motor 3 which is operated at a time interval of one minute and the surface of the disc 159 is divided into two sections, that is the power interruption section 160 and the power flowing section 151. The above-mentioned attractive piece 139 is connected to the indicating disc 159 and is normally attracted by and held against the core 138 while power is flowing through the motor 3.

The above-mentioned manipulating bar 141 is spring-loaded as shown by numeral 142 and adapted to slidably move when the cover plate 130 is opened. The manipulating bar 141 is provided with a pusher member 158 projecting vertically of the manipulating bar 141. The indication disc 159 is provided with the projection 157 at a point in its periphery opposite to the pusher member 158. When power supply to the motor 3 is interrupted, the attractive piece 139 which is connected to the indicating disc 159 is separated from the core 138 and descends whereupon the cover plate 130 is opened and the pusher member 158 is caused to slidably displace on the manipulating bar 141 so as to push the projection 157 of the indication disc 159. As the projection 157 is pushed in the manner mentioned above the indication disc 159 which is integral with the projection 157 is rotated so as to automatically return itself and the attractive piece 139 to the normal positions or power flowing condition in which the pusher member 158 is held against the core 138 of the Warren motor 3. With the above arrangement, when power supply to the Warren motor 3 is interrupted accidentally, the attractive piece 139 separates from the core 138 under its gravity and the indication disc 159 is rotated so as to bring the power interruption indication section 161 in alignment with a window 140 formed in the casing 114 through which the operator can detect the power interruption condition. Even when power supply to the motor 3 is resumed after the power interruption, the interruption indication section 161 remains in alignment with the window 140 until a user manipulates the adjusting mechanism. Accordingly, when the user detects the power interruption condition through the window 140 he can find out how long the machine was inactive by comparing the time indication given by the clock mechanism with the actual line indication given by his watch and adjust the lagging of the parts of the time recording and indicating wheels in accordance with the correct time indication on his watch.

Now, the time indicating device F will be in detail explained referring to FIGS. 22 through 31. This device is applied to the present time recorder to render more useful functions, that is, ringing the bell at a predetermined time and shifting the carbon ribbon having two different colored or the black and red bands. Reference numeral 31 indicates a cylindrical member adapted to rotate one complete revolution for a time period of one hour and the cylindrical member is formed with 24 vertically spaced fins 32 in its overall peripheral surface and five laterally spaced longitudinal grooves 33 intersecting at right angles to the fins 32 thereby to form a plurality of projections 34. As shown in FIGS. 30a and 30b a manually positioned microswitch actuating piece 35 is adapted to fit on one optionally selected projection 34 with the opposite legs 36 of the piece riding over the projection 34 in accordance with the practice followed in the office in which the time recorder is installed. The piece 35 is adapted to actuate either a microswitch 37 or 38 or both the microswitches 37 and 38 as will be in detail described hereinafter.

Figure 28:
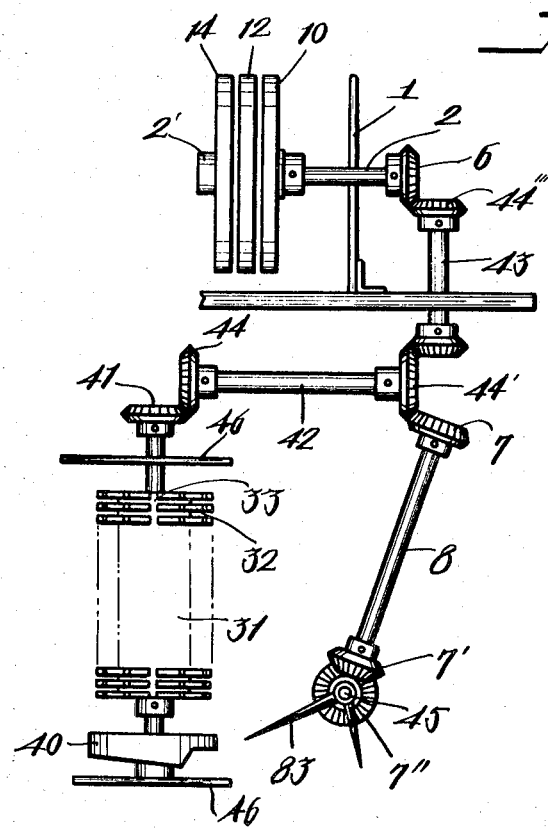
FIG. 28 is a fragmentary view of a modified form of interlocking mechanism for said cam drive mechanism, time recording wheel unit and time indicating device.

The cylindrical member 31 as mounted about a rotatable shaft 39 having the opposite ends thereof suitably journalled in the framework 46 of the device F. The shaft 39 has a cam 40 secured to the lower end portion and a bevel gear 41 secured to the other or upper end. As shown in FIG. 28, illustrating a modified form of interlocking mechanism for the cam drive mechanism, time recording wheel unit and time indicating device the bevel gear 41 meshes with a bevel gear 44 secured to the adjacent end of a transverse shaft 42 and the shaft 42 also has a bevel gear 44′ which meshes with a bevel gear 44″ secured to the lower end of a vertical shaft 43 and the other or upper end of the shaft 43 has a bevel gear 44‴ secured thereto. The bevel gear 44‴ meshes with the bevel gear 6 at the adjacent end of the drive shaft 2 which is shorter than the drive shaft 2 of the preceding embodiment of FIG. 4 of the drive device A. The bevel gear 44′ of the shaft 42 also meshes with the bevel gear 7 of the shaft 8 the other bevel gear 7′ on the shaft 8 which engages the bevel gear 7″ secured to the adjacent end of the drive shaft 45 of the clock hand 83 whereby the time indicating shaft 45 is rotated at the same rate as that at which the cylindrical member 31 is rotated. A vertical mounting plate 47 is secured to the framework 46 and a vertically movable ratchet 48 is movably supported on the mounting plate. The other arrangement of the modified interlocking mechanism is substantially the same as that of the preceding embodiment. The ratchet 48 is provided at the lower end thereof with a roll 49 and the lower end of the ratchet has a spring 49′ secured thereto so as to normally urge the ratchet end against the operative underside of the cam 40. Thus, as the cam 40 rotates the ratchet 48 is first gradually depressed down and then suddenly pushed up.

The side of the mounting plate 47 opposite to the side to which the ratchet 48 is mounted mounts a stabilizing plate 51 having a similar ratchet 50 for slant movement with respect to the vertical direction of the plate 47 along upper and lower slant slots 52 and 52′ formed in the mounting plate 47. Set screws 53 and 53′ extend the slant slots 52 and 52′ respectively and secure the stabilizing plate 51 to the mounting plate 47 to permit the plate 51 to move slantly and an engaging piece 56 having an engaging pin 54 at one end for engaging the stabilizing plate 51 and one end of a spring 55 secured to the other end is adapted to stabilize the stabilizing plate 51 by engaging either notch 57 or 58 both of which are formed in the stabilizing plate 51. The other end of the spring 55 is anchored to the machine framework 46.

The machine framework 1 has a pair of vertically extending and laterally spaced support columns 59 which support a transverse frame 62 at the opposite ends thereof for vertical movement (FIG. 27) and the transverse frame pivotally supports operating pieces 60 and 61. The transverse frame 62 further pivotally supports engaging pieces 63 and 63′ which are adapted to engage the ratchet 48 and stabilizing plate 51, respectively.

As the came 40 rotates the ratchet 48 is depressed overcoming the force of the spring 49 and then allowed to rise by the spring. As the cam 40 rises in the manner as mentioned above the transverse frame 62 is raised by the engaging pawls 63 and 63′ and the operating pieces 60 and 61 are moved to the positions in which the pieces are aligned with the next immediately upper projections 34, respectively. Thus, when the operating pieces 60 and 61 are moved up to the position of the projection 34 on which the microswitch actuating piece 35 fits, the actuating piece pushes the operating pieces 60 and 61 so as to pivot the actuating members 64 and 64′ which are suitably pivoted to the machine framework 1 and have projections 65 and 65′ at the lower ends thereby the projections depress down the push buttons 66 and 67 on the microswitches 37 and 38 to ring the bells (not shown) whereby a carbon ribbon having an upper black section and a lower red section is displaced so as to present the lower red section to the operative position. The operating pieces 60 and 61 may depress both the buttons 66, 67 and bells or depress down either the buttons or bells. In the latter case, the tip end of the actuating piece 35 may be modified as indicated with reference numeral 35′ in FIG. 30b.

Figure 27:
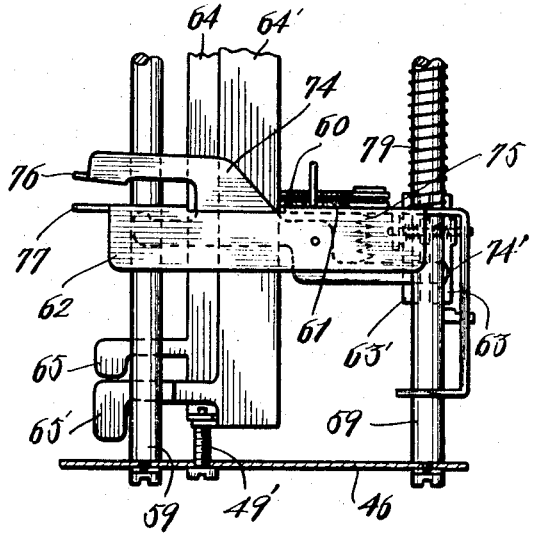
FIG. 27 is an enlarged fragmentary view of portion of said cam drive mechanism of FIG. 26.

Reference numeral 68 indicates a safety member in the form of an elongated bar and the opposite ends of the safety member may be rotatably supported by pins 68′ which are screwed in the machine framework 46. The safety member 68 is provided at the lower end with an integral lateral projection 69 which is engaged and pushed by a presser piece 70 secured to the upper surface of the cam 40 and projecting upwardly of the cam surface. As the cam 40 rotates the presser piece 70 engages the projection 69 to push the latter whereby the safety member 68 may be rotated about the pins 68′ and the transverse frame 62 may be disengaged from its engagement with the comb-shaped rugged side 73 of the safety member 68 and allowed to move upwardly. Immediately after the transverse frame 62 has been moved up to a predetermined position the safety member 68 again engages the transverse frame 62 by means of the comb-shaped side 73 and hold the frame in position. In FIG. 27, reference numeral 74 indicates a manual operating member which is pivoted to the transverse frame 62 and a spring 75 in anchored at one end to the rear end of the manual operating member 74 and the other end of the spring is anchored to a suitable support means. The manual operating member 74 has a finger piece 76 at the tip end thereof which is opposite to a co-operating finger piece 77 formed at the adjacent end of the transverse frame 62. When the finger pieces 76 and 77 are manually pushed toward each other overcoming the force of the spring 75 the rear end of the manual operating member 74 pivots the pivotal support members 78 of the engaging pawls 63 and 63′ thereby to disengage the engaging pawls from the ratchet whereupon the transverse frame 62 can be manually adjusted to a desired position. A weak spring 79 is disposed about the upper portions of the support columns 59 with the upper ends of the springs secured to suitable means so as to normally urge the transverse frame 62 downwards.

Next, the operation of this novel device is described. As the cylindrical member 31 rotates one complete revolution for a time period of one hour, the manual microswitch actuating piece 35 or 35′, which is at the particular time fit on one fin optionally selected from the plurality of fins 32, strikes against the operating pieces 60 and 61 pivotally supported by the transverse frame 62 whereupon the operating pieces cause the operating members 64 and 64′ to pivot. As the operating members 64 and 64′ are pivoted in the above manner, the projections 65 and 65′ on these operating members depress down the push buttons 66 and 67 on the microswitches 37 and 38 so as to ring the bells which indicates the user it is necessary to manually displace the black and red sectioned carbon ribbon so as to present the lower red section to the operative position (assuming that the upper black section is now in the operative positions). In this case, as the cylindrical member 31 rotates in the above manner, the cam 40 secured to the lower end of the shaft 39 for the cylindrical member 31 is simultaneously rotated together with the cylindrical member and the presser piece 70 secured to the cam 40 strikes against the lateral projection 69 integral with the elongated bar-shaped safety member 68 whereupon the finger piece 77 on the transverse frame 62, which is then fit on the comb-shaped side 73 at a particular point along the height of the latter on the safety member 68, is released from the side 73 and at the same time the roll 49 at the lower end of the ratchet 48 is rotated so as to push the transverse frame 62 upwardly. As the transverse frame 62 is pushed up as in the manner mentioned above, the frame is engaged by the engaging pawls 63 and 63' and the operating pieces 60 and 61 are moved to the positions in which the pieces are aligned with the immediately upper projections 34, respectively.

When the transverse frame 62 has reached its predetermined highest position, the lateral projection 206 on the transverse frame abuts against the projection 205 provided at the upper end of the stabilizing plate 51 whereupon the slant slots 52 and 52' in the stabilizing plate 51 slantly move about the set screws 53 and 57', respectively, and the pin 54 on the engaging piece 56 secured to the lower end of the mounting plate 47 moves from the upper notch 57 to the lower notch 58 both of which are formed in the stabilizing plate 51, thereby to stabilize the stabilizing plate 51. In this case, the engaging pieces 63 and 63' are released from the stabilizing plate 51 and ratchet 48 so as to allow the transverse frame 62 to descend down. As the transverse frame 62 descends down in the manner mentioned above, the lateral engaging projection 206 on the frame strikes against the laterally extending pin 207 on the lower portion of the stabilizing plate 51, and the engaging pin 54 on the engaging piece 56 returns to the upper notch 57 in the stabilizing plate 51.

As mentioned above, this novel device can perform its necessary functions of ringing the bell and shifting the carbon with simple construction. In addition, since the cylindrical member 31 is arranged to intermittently rotate in the predetermined timing relation to the unit, and the hands 83 of the clock 81 the movement of these elements can be precisely coordinated. Furthermore, the switch 19 also as a plural functions and the vertical movable transverse frame member 62 can be also positively raised by either manual or automatic manipulation. Since the shaft 45 for the clock hands is interconnected through the bevel gear 6 on the drive shaft 2 and the bevel gears 7, on the connection bar 8 and the gear 7' on the clock hand shaft 45 to the drive shaft 2 on which the time recording wheel unit is mounted, the time recording wheel unit and the clock or time indicating wheel unit can be operated in synchronized relation. When a card is inserted into the card receiver with the side where recording is to be made facing the time recording wheel unit with the ribbon section at the window 82 and a hammering member 300 is automatically actuated so as to cause the hammering member 300 to strike the side opposite to the recording side. The recording of the present time is made on the recording side (see FIG. 32). It will be understood that the longer hand 83 of the clock 81 is rotated about its shaft 45 is synchronized relation with the shaft 2 on which the time recording wheel unit is mounted, as the shaft 2 rotates by the predetermined angular distance as each minute elapses. As mentioned above, the drive shaft 2 is rotated by the above-mentioned angular distance every minute as the Warren motor 3 is intermittently rotated at a time interval of one minute. In other words, as the Warren motor 3 is rotated in the manner mentioned above, the output shaft 3' (FIG. 5) of the motor is rotated and the rotation of the shaft 3' in turn rotates the cam disc 4 having the cam pin 4' which is fixedly mounted on the motor shaft 3'. The rotation of the cam disc 4 causes its cam pin 4' to engage and pivot the lever 5 which in turn causes its engaging pawl 5' to engage one selected tooth of the teeth on the ratchet wheel 9. As the lever 5 pivots back to the initial position the ratchet wheel is advanced or rotated by one tooth. The advancement or rotation of the ratchet wheel 9 in the manner mentioned above causes the drive shaft 2 on which the ratchet wheel 9 is fixedly mounted to rotate. The rotation of the drive shaft 2 causes the minute-wheel 10 which is fixedly mounted on the drive shaft to rotate by one embossed numeral. After the above procedure has been repeated sixty times and the cam 9' integral with the ratchet wheel 9 has rotated one complete revolution to return to the initial position, the cam 9' engages the lever 15 having its engaging pawl 15' and pivots the lever so as to cause the pawl 15' to engage one tooth of the teeth on the ratchet wheel 11. As the lever 15 pivots back to the initial position the ratchet wheel 11 is advanced or rotated by one tooth. The rotation of the ratchet wheel 11 in the manner as mentioned above causes the hollow shaft 2' on which the ratchet wheel is fixedly mounted to rotate. The rotation of the hollow shaft 2' rotates the hour-wheel 12 which is fixedly mounted on the hollow shaft 2' by one embossed numeral. As the above procedure is repeated twenty-four times and just before the 24th cycle of the procedure has been completed projection 11' on the ratchet wheel 11 engages and pushes the microswitch actuating bar 19 whereby the pushed actuating bar closes the microswitch 19 which in turn energizes the magnet 17 through the circuit established between the microswitch and magnet. The energized magnet 17 pushes the card manipulation bar 18 up and the bar in turn pivots the lever 16 as shown in FIG. 4. As the lever 16 is pivoted in the manner as mentioned above, the engaging pawl 16' of the lever 16 engages one tooth of the teeth on the ratchet wheel 13 and as the lever 16 pivots back to the initial position the pawl 16' rotates or advances the ratchet wheel 13 by one tooth. The rotation of the ratchet wheel 13 in the manner as mentioned above causes the hollow shaft 2' on which the ratchet wheel 13 is fixedly mounted to rotate and accordingly, the day-wheel 14 is advanced or rotated by one embossed numeral.

While on preferred embodiment of the invention has been shown and described in detail it will be understood that the same is for the purpose of illustration only and is not to be taken as a definition of the scope of the invention.

What is claimed is:

1. In a time recorder of the type including printing character embossed time recording wheels cooperative with a printing ribbon and an impact mechanism to print minute, hour and day time indications, a drive shaft means, drive means operative to turn one revolution a minute, said printing character embossed time recording wheels comprising minute, hour and day wheels mounted on said drive shaft means, coupling means operative in response to turning of said drive means to index said minute wheel a minute step once per drive means revolution and to correspondingly turn said drive shaft means, further coupling means operative to index said hour wheel an hour step once per sixty minute step indexing movements of said minute wheel, additional coupling means operative to index said day wheel a day step once per twenty-four hour step indexing movements of said hour wheel, a time indicating clock including a clock hand shaft, minute and hour hands thereon and gearing means operatively coupled between said drive shaft means and said clock hand shaft and operative to turn said minute hand in correspondence with the minute step indexing movements of said minute wheel whereby the time indicating turning movement of said time indicating clock is interlocked with said drive means and said time recording wheels and said drive means, coupling means, further coupling means and additional coupling means comprising a Warren motor, a cam actuated by said motor, a first ratchet wheel, a second cam secured to one side thereof for driving said drive shaft means, said minute wheel being mounted on said drive shaft means in spaced relation to said first ratchet wheel, said hour wheel being freely mounted on said drive shaft means between said first ratchet wheel and said minute wheel, a second ratchet wheel connected with said hour wheel, said day wheel being mounted on said drive shaft means on the side of said hour wheel and opposite to said minute wheel, a third ratchet wheel connected to said day wheel, said wheels being in side by side relation and constituting a time recording printing unit, a pivotal lever mounted adjacent said first ratchet wheel, a pawl carried thereby and operative to engage said first ratchet wheel, a second pivotal lever mounted adjacent said second ratchet wheel, a second pawl mounted thereon and adapted to engage said second ratchet wheel, a third pivotal lever mounted adjacent said third ratchet wheel, a third pawl mounted thereon adapted to engage said third ratchet wheel, said first lever being actuated by said cam as said cam is rotated one complete revolution, said second lever being actuated by said second cam as said second cam rotates one complete revolution, a solenoid, a power source, a switch means operably by said second ratchet wheel as the same rotates one complete revolution, said switch means connecting said power source with said solenoid, and means actuated by said solenoid for actuating said third lever.

References Cited

UNITED STATES PATENTS

| | | | |
|---|---|---|---|
| 2,130,873 | 9/1938 | Bourquin | 58—125 |
| 2,281,998 | 5/1942 | Rast | 346—20X |
| 2,392,467 | 1/1946 | Engel et al. | 346—87X |
| 2,430,782 | 11/1947 | Poole | 340—253X |
| 2,645,551 | 7/1953 | Sprecker | 346—85 |
| 2,773,733 | 12/1956 | Lorenz | 346—84 |
| 2,874,773 | 2/1959 | Lorenz | 346—20X |

JOSEPH W. HARTARY, Primary Examiner

U.S. Cl. X.R.

346—17, 47, 86, 91